Patented Aug. 11, 1925.

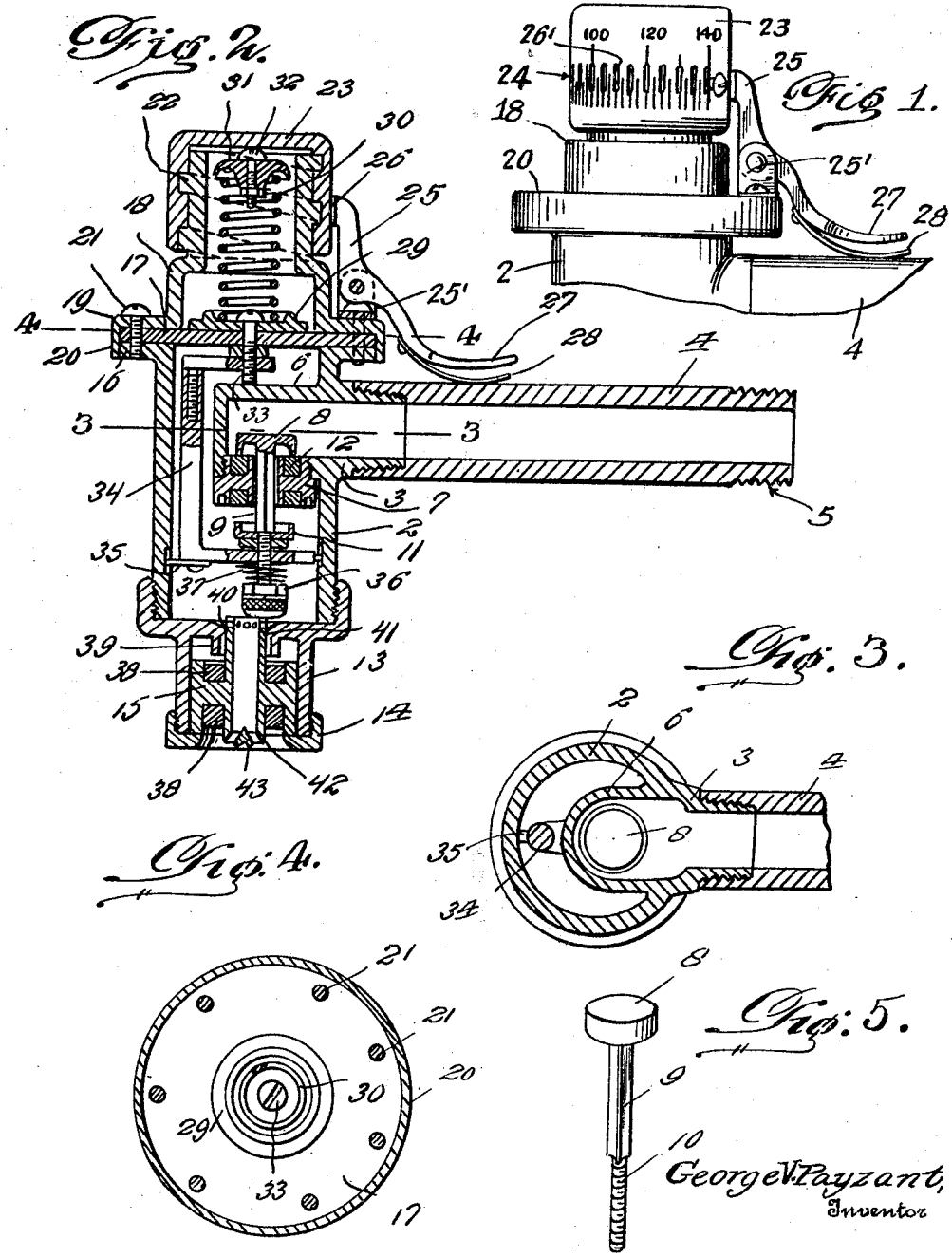

1,548,902

UNITED STATES PATENT OFFICE.

GEORGE V. PAYZANT, OF APPLETON, WISCONSIN.

AUTOMATIC PRESSURE CUT-OFF FOR AIR HOSE.

Application filed February 16, 1924. Serial No. 693,291.

*To all whom it may concern:*

Be it known that I, GEORGE V. PAYZANT, a citizen of the United States, residing at Appleton, in the county of Outagamie and State of Wisconsin, have invented certain new and useful Improvements in Automatic Pressure Cut-Offs for Air Hose, of which the following is a specification.

This invention relates to improvements in an automatic cut off for air hose, and particularly to a cut off structure for use with air hose at automobile service stations where the device is applied to the valve stem of automobile tires and adapted for operation thereby to admit air to the tire from the source of supply, means being provided in connection with this cut-off for automatically shutting the air off when the air in the tire reaches a predetermined pressure.

An object of the invention is to provide a valve head for the end of air hose having an outlet adapted for positioning over the end of a valve stem so that the valve stem will disengage the valve passing in the housing for admitting air pressure to the tire, the head having means operable to close the valve in the head when a predetermined pressure in the outlet opening and in the tire has been reachd.

Another object of the invention resides in providing a housing having an inlet adapted for attachment to an air hose from a source of supply under pressure, a valve for controlling the inlet of air to said housing, normally closed by the air pressure from the source, an outlet for the housing adapted for positioning over a tire valve stem, having means therein adapted for operation by the valve stem to unseat the valve in the inlet and permit a passage of air through the housing to the tire, said housing being provided with means on the outlet side of the valve operated by the pressure built up in the tire and on the outlet side of the valve, adapted to operate a complementary valve to close the air passage from the source of air supply when a predetermined pressure of air in the tire is reached, said means adapted for adjustment to operate at any one of a plurality of predetermined pressures.

The invention comprehends other objects and improvements in the details of construction and assemblage of the parts providing for a manual control in adjusting the air pressure at which the valve is closed, which is more particularly described in its detail in the following description and set forth in the claims directed to a preferred form of the invention, it being understood however, that variations may be made in the construction of the parts and the assemblage thereof for carrying out the above purposes without departing from the spirit and scope of the invention as described and claimed.

In the drawing:

Figure 1 is a side elevation of the upper portion of the automatic valve head attachment for air hose.

Figure 2 is a vertical longitudinal sectional view through the head.

Figure 3 is a sectional view taken on the line 3—3 of Figure 2.

Figure 4 is a sectional view taken on the line 4—4 of Figure 2.

Figure 5 is a detail perspective view of the valve for closing the air inlet passage.

The head is indicated generally at 1 having a main casing section 2 provided with a laterally extending nipple 3 from the central portion thereof for threadedly receiving a pipe fitting 4 formed at its outer end as indicated at 5 for receiving the fitting at the end of a flexible air hose such as that used at automobile service stations for supplying compressed air to automobile tires. The casing 2 is provided on the interior with an inwardly projecting portion 6 communicating with the nipple 3 and provided for receiving a removable valve seat 7 on the lower side thereof having a central air passage therethrough and slidably receiving the valve member 8 having the stem 9 slidably extending through the opening therein and provided with a reduced threaded portion 10 on which is mounted a complementary valve 11 in opposed relation with the valve 8 and adapted to seat on the opposite face of the seat member 7. Each of the valves 8 and 11 are provided with annular flanges adapted to seat against ring members 12 of suitable material mounted in annular recesses in the opposite faces of the valve member 7.

The lower end of the casing or housing 2 is provided with external threads for receiving an outlet casing 13 having a removable retaining ring 14 mounted on the free end thereof for retaining the valve operating member 15 within the outlet casing for sliding movement therein.

The upper end of the housing 2 is provided with an annular flange 16, on which is seated a diaphragm 17 which is secured in place by a supplemental casing 18 having an annular flange 19 and a cylindrical extension 20 from the outer edge of the flange, the flange being adapted to seat against the diaphragm 17, while the cylindrical extension fits over the periphery of the diaphragm 17 and the flange 16 of the housing 2, securing means indicated at 21 extending through the flanges 19 and 16 for effectively securing the supplemental housing to the main housing 2, and also securing the diaphragm 17 in proper position between said housings. The upper end of the supplemental housing 18 is provided with threads 22 of substantially large form for receiving the corresponding threaded adjusting member 23 which is provided on the exterior thereof with a plurality of scale markings 24, the purpose of which will be presently described. An indicating and locking lever 25 is pivotally mounted intermediate its ends in a bracket 25' secured by the securing means 21 to the upper side of the flange 19, one end of the lever being provided with a V-shaped end portion 26 adapted for cooperation with V-shaped notches 26' in the cylindrical surface of the adjusting member corresponding with the scale markings, so that the adjusting member is retained by the locking lever in any one of the set positions by the ends 26 cooperating and seating in the corresponding notch of the adjusting member. The other end of the lever 25 extends downwardly and outwardly into proximity with the tubular inlet pipe 4 where it is provided with an enlarged head 27 providing a convenient means for operating the lever manually, a spring 28 secured to the end portion of the lever engaging the tubular inlet pipe and normally retaining the end 26 in engagement with the adjusting member.

A disc 29 is seated against the upper side of the diaphragm 17 in the supplemental housing 18 for receiving one end of a coil compression spring 30, the other end of which is seated in a spring receiving member 31, carrying an adjusting screw 32 which engages the adjusting member and is adapted for adjustment in the spring receiving member in order to change the tension of the spring relative to the diaphragm 17 in its relation to the adjusting member. The disc 29 is secured to the diaphragm by means of a limiting screw 33 which extends through the disc, the diaphragm, and receives a U-shaped valve operating member 34 on the lower side of the diaphragm through threaded engagement with one leg thereof, the U-shaped valve operating member being formed of a pair of stepped separable sections as clearly shown in Figure 2 of the drawings to permit convenient assemblage of the parts, and the limiting screw extending downwardly beyond the leg of the U-shaped valve operating member for contact with the upper side of the inwardly extending housing 6, in order to limit the downward movement of the diaphragm through the action of the spring 30. The other leg of the U-shaped operating member 34 is provided with an opening for receiving the extension 10 from the valve stem 9, said leg being adapted to engage the under side of the valve 11 and move the same upwardly together with the valve 8 when air pressure within the housing 2 acts to overcome the compression of the spring 30 through the diaphragm and moves the valve operating member 34 upwardly, the adjustment of the member 23 being adapted to permit the operation of the diaphragm and the valve operating member 34 to seat the valve 11 when a predetermined pressure acts on the diaphragm. Guides 35 are mounted on the lower arm of the valve operating member 34 and extend from opposite ends thereof into slots extending longitudinally of the main housing 2 for guiding said operating member in its movement under action of the diaphragm 17. A cap nut 36 is threadably mounted on the end of the extension 10 of the valve stem, and a relatively weak coil spring 37 is mounted between the cap nut 36 and the lower leg of the operating member 34 normally acting to pull the valve 8 downwardly into engagement with its seat, the springs 37 in no way affecting the operation of the valve by the operating member 34, but merely insuring a downward movement of the valve stem through said operating members.

The sliding valve operating member 15 in the outlet housing is provided with annular recesses in the opposite faces thereof for receiving washers 38, the lower one of which is adapted for engagement with the end of the valve stem of an automobile tire and the like, and the upper one of which is adapted for engagement with the depending annular shoulder 39 on the upper end wall of the outlet housing which is provided with a concentric central opening for slidably receiving the sleeve extension 41 of the slidable valve operating member 15, extending therethrough and provided with a plurality of openings in the upper end thereof, to permit air from the main housing 2 to flow through said sleeve and the member 15 into the depending outlet sleeve 42 extending from the lower end of the member 15, and provided with a tire valve stem operating member 43, adapted to depress said valve stem when the outlet casing is applied thereto. The upper end of the sleeve extension 41 is adapted to engage the cap nut 36 so that an upward movement of the sliding operating member 15 will produce a corresponding upward movement of the valve stem 9 with the valves 8 and 11 for permitting air from the inlet 3 in the housing to pass into the main housing 2 and operate the diaphragm 17 as well as pass through the outlet casing 13 and the sleeve 42 into the stem and tire of an automobile tire structure for inflating said tire in a usual and well known manner.

From the foregoing description, it will be observed that air pressure from the source of air supply is constantly maintained within the sleeve 4 and the inward projecting portion 6 of the main housing 2 for normally seating the valve 8 against the seating ring 12, and thereby preventing air pressure from the source from entering the main portion of the housing 2. With the parts in this position, assume that it is desired to inflate the tire on an automobile wheel to 60 pounds pressure. The cap 23 is rotated on the supplemental casing 18 following the operation of the lever 24 to release the end 26 from engagement therewith, until the proper scale division indicated at 25 comes into position for engagement by the end 26 of the lever, at which time the lever is released, so that the end 26 will seat in the notch in the adjusting member for holding it in this set position. With the parts now set for operation at 60 pounds pressure, the retaining ring 14 of the outlet casing 13 is applied over the end of a tire valve stem, the operating member 43 engaging the stem of the valve and depressing the same in the application of the device to the valve stem for depressing the valve, the end of the valve stem subsequently engaging with the washer 38 carried by the sliding operating member 15 so that a subsequent downward movement of the main housing and outlet housing 13 relative to the valve stem of the tire will act to force the member 15 upwardly in the outlet housing until the upper ring 38 engages the depending shoulder 39, the sleeve extensions 41 in the movement operating the cap nut and the valve stem 9 to produce an upward movement thereof and unseat the valve 8 from its seating ring 12 in the valve seat 7, so that a flow of air from this source is permitted to enter through an opening in the valve member 7 to the main housing 2 and outwardly through the slide member 15 into the valve stem of the tire. As the air pressure builds up in the tire, a corresponding pressure will be built up in the housing 2 which will operate to produce a corresponding pressure on the diaphragm 17, which as it will be clearly understood from examining Figure 2 of the drawing will produce a nupward movement of the diaphragm against the tension of the compression spring 30. When the pressure builds to the said sixty pounds of pressure in the tire and in the main housing 2, an upward movement of the valve of the diaphragm 17 will be effected sufficient to move the operating member 34 upwardly and also move the valves 8 and 11 upwardly with the stem 9 so that as the sixty pounds pressure is reached, the valve 11 will engage its seating ring 12 and close the passage in the seating member 7 to prevent additional air from passing through the housing from the source of supply and into the tire. It will thus be seen that a predetermined amount of air will be permitted to enter the tire shut off when a predetermined pressure is reached according to the adjustment of the member 23. As soon as the main housing and outlet housing 13 are moved upwardly from the valve stem of the tire, the sliding member 15 will be permitted to drop in the outlet housing and the air will also be permitted to exhaust which will allow the spring 30 to operate the diaphragm 17 and the operating member 34 to return it to the position shown in Figure 2 which will be aided by the air pressure from the source of supply for closing the valve 8 in respect to its seat 12 in restoring the parts to a normal position for preventing the escape of air through the head and housing ready for a subsequent operation for charging a tire with air.

It will therefore be apparent that a novel and convenient form of head has been provided for air hose containing valve operating means adapted to automatically permit a predetermined amount of air to be exhausted from a source of air supply at a relatively high pressure to a tire or other means where a relatively low pressure is desired and for automatically cutting off the supply of air without removing the head from the article to be charged with air when the predetermined desired pressure is reached, and that when the head is removed from the charge element, the parts will be automatically restored to a normal position for subsequently charging another article or tire with air.

What is claimed is:

1. An automatic pressure cut off for air hose, including a housing having an air inlet for attachment to an air hose from the source of air supply under pressure, an outlet from the housing, a valve mounted in the housing and normally closed by the air pressure from the air inlet, means operable through the outlet for unseating the valve for permitting a flow of air, and means for automatically operating the valve to cut off the air from the supply when a predetermined pressure is reached at the outlet end of the housing.

2. In combination, a housing having an air inlet, a source of air under pressure connected with the air inlet, a valve in said housing for controlling the entrance of air thereto, an outlet from the housing, means positioned in the outlet and operable by an element adapted to be charged with air for opening said valve to permit an outlet of air from the source through the housing, and air pressure operated means for closing said valve when a predetermined pressure in said element being charged with air is reached.

3. In combination, a housing having an air inlet, a source of air under pressure connected with the air inlet, a valve in said housing for controlling the entrance of air thereto, an outlet from the housing, means positioned in the outlet and operable by an element adapted to be charged with air for opening said valve to permit an outlet of air from the source through the housing, air pressure operated means for closing said valve when a predetermined pressure in said element being charged with air is reached, and means for manually changing the operation of the air pressure operated means for varying the air pressure at which said means will close the valve in said housing.

4. In combination, a main housing having an air inlet at one side for connection to a source of air supply under pressure, a valve mounted in said housing controlling a passage from the air inlet into the housing and movable longitudinally of the housing, one end of said housing having an outlet, means in the outlet operable by a member adapted to be inflated with air, adapted to engage and operate said valve for permitting a flow of air into said housing from the inlet, said means operating in substantial alignment with said valve, and adjustable pressure operated means movable longitudinally of the casing and having connection with the valve for closing the passage into the housing, by seating the valve when a predetermined pressure is built up in the housing.

5. In combination, a housing having an inlet connected with a source of air supply under pressure, an outlet, and a valve for controlling the entrance of air to the housing from the inlet normally in closed position, initial operated means for opening said valve operable through an element adapted to be charged with air, and pressure operated means for subsequently closing said valve adjustable for closing the valve when a predetermined air pressure is built up in the housing.

6. In combination, a main housing having an air inlet, a valve for controlling the entrance of air to said housing from said inlet normally closed, a diaphragm operable under air pressure having connections with said valve, means for varying the action of the diaphragm under air pressure, an outlet from said main housing, a slidable member in the outlet adapted for opening said valve in the sliding movement thereof under operation by an element to be charged with air, said diaphragm operating subsequent to the opening of the valve under air pressure for closing the valve through the connection therewith when a predetermined air pressure is discharged in the said element.

7. In combination, a main housing having an air inlet from a source of air under pressure, a valve reciprocable in the housing normally closing the inlet of air thereto, a diaphragm, a supplemental housing securing the diaphragm to one end of the main housing, manually adjustable means in the supplemental housing for adjusting the operation of the diaphragm under air pressure in the main housing, connections between the diaphragm and the valve for reciprocating said valve in the movement of the diaphragm when operated under a pressure, an outlet housing mounted on the opposite end of the main housing having a slidable valve operating member therein, said outlet housing being adapted for positioning over the stem of an object to be charged with air, said stem being adapted for sliding said member in the outlet housing to reciprocate the valve and unseat the same for permitting air pressure to enter the housing and pass through said outlet housing into the object, the air pressure in the housing and the object operating the diaphragm for reciprocating the valve and moving it to a closed position when a predetermined pressure in the housing and the object is reached.

8. A device of the class described comprising a housing having an air inlet connection at one side thereof for attachment to an air hose from a source of supply of air under pressure, a valve movable longitudinally of the housing adapted for cooperation with the valve seat therein, for controlling the passage of air from the inlet thereto, an outlet at one end of said housing, means mounted in the outlet and movable therein, operable upon engagement with an element to be inflated for operating said valve to permit a flow of air from the inlet through the housing and through the outlet, and pressure operated means in the housing operating longitudinally thereof in connection with said valve, and seating the valve when a predetermined pressure is reached in the housing, and means for adjusting the pressure at which said last mentioned means operates.

9. A device of the class described comprising a housing having an air inlet formed in one side thereof and provided with a valve seat within the central portion of the housing, a valve reciprocable longitudinally of the housing and operable to engage said seat to control the flow of air from the inlet into the housing, an outlet at one end of the housing, reciprocating means mounted in the outlet and operable for unseating the valve to permit a flow of air into the housing and through the outlet, and adjustable pressure operated means mounted in the opposite end of the housing sensitive to the air pressure in said housing for operating to seat said valve when a predetermined pressure is built up in the housing.

10. A device of the class described comprising a housing having an air inlet formed in one side thereof and provided with a valve seat within the central portion of the housing, a valve reciprocable longitudinally of the housing and operable to engage said seat to control the flow of air from the inlet into the housing, an outlet at one end of the housing, reciprocating means mounted in the outlet and operable for unseating the valve to permit a flow of air into the housing and through the outlet, and adjustable pressure operated means mounted in the opposite end of the housing sensitive to the air pressure in said housing for operating to seat said valve when a predetermined pressure is built up in the housing, said pressure operated means including a diaphragm mounted over the opposite end of said housing, a supplemental housing secured to the main housing adapted to secure the diaphragm thereto, resilient means mounted between the diaphragm and the end of said supplemental housing, and adjustable means on said supplemental housing for adjusting the tension of the resilient means.

In testimony whereof I affix my signature.

GEORGE V. PAYZANT.